(12) United States Patent
Porikli et al.

(10) Patent No.: US 7,734,097 B1
(45) Date of Patent: Jun. 8, 2010

(54) DETECTING OBJECTS IN IMAGES WITH COVARIANCE MATRICES

(75) Inventors: Faith M. Porikli, Watertown, MA (US); Tekin Kocak, Brooklyn, NY (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 847 days.

(21) Appl. No.: 11/497,997

(22) Filed: Aug. 1, 2006

(51) Int. Cl.
G06K 9/46 (2006.01)
G06K 9/66 (2006.01)
G06K 9/80 (2006.01)

(52) U.S. Cl. .................. 382/190; 382/156; 382/224; 382/276

(58) Field of Classification Search .............. 382/190, 382/191, 276, 280, 224–228, 156–160
See application file for complete search history.

(56) References Cited

U.S. PATENT DOCUMENTS

| 5,768,477 | A * | 6/1998 | Johnson et al. | 706/24 |
| 2005/0201595 | A1* | 9/2005 | Kamei | 382/118 |
| 2006/0104484 | A1* | 5/2006 | Bolle et al. | 382/115 |

* cited by examiner

*Primary Examiner*—Jon Chang
(74) *Attorney, Agent, or Firm*—Dirk Brinkman; Gene Vinokur (57) ABSTRACT

A method detects objects in an image. First, features are extracted from the image. A frequency transform is applied to the features to generate transformed features. A covariance matrix is constructed from the transformed features, and the covariance matrix is classified to determine whether the image includes the object, or not.

10 Claims, 8 Drawing Sheets

DETECTING OBJECTS IN IMAGES WITH COVARIANCE MATRICES

FIELD OF THE INVENTION

This invention relates generally to detecting objects in images, and more particularly to detecting objects that can rotate in an image plane.

BACKGROUND OF THE INVENTION

Detecting objects in images is a fundamental problem in computer vision. Object detection is a necessary first step before the objects can be tracked or identified.

One broad class of object detection techniques constructs a model of the object, and pixels in images are compared to the model. One problem in object detection is that the object can have various poses with respect to the image plane, e.g., rotational variation. Therefore, it is desired to have a model that is invariant to the poses of the object In the following description, the example object to be detected is a vehicle license plate. However, it should be understood that the invention can be worked many different types of objects, e.g., human faces, vehicles, and the like.

Methods for detecting license plates are well known: L. Dlagnekov, "Car license plate, make, and model recognition," Proc. IEEE Conf. on Computer Vision and Pattern Recognition, 2005; W. Förstner and B. Moonen, "A metric for covariance matrices," Technical report, Dept. of Geodesy and Geoinformatics, Stuttgart University, 1999; and C. Rahman, W. Badawy, and A. Radmanesh, "A real time vehicle license plate recognition system," Proceedings of the IEEE on Advanced Video and Signal Based Surveillance, AVSS03, 2003.

License plate detection can be used in security and traffic monitoring systems. Often the extracted information is used for enforcement, access-control, and flow management, e.g., to keep a time record on the entry and exit for automatic payment calculations or to reduce crime and fraud.

However, detecting license plates with varying poses, changing lighting conditions and corrupting image noise, without using an external illumination source is difficult.

Methods can be rule based or use a trained classifier. A simple method first detects license plate boundaries. An input image is processed to amplify the edge information using gradient filtering and thresholding. Then, a Hough transformation is applied to detect parallel line segments. Coupled parallel lines are considered as license plate candidates.

Another method uses a gray level morphology. That method focuses on local appearance properties of license plate regions such as brightness, symmetry, orientation, etc. Candidate regions are compared with a given license plate image based on the similarity of these properties.

Classifier based methods learn different representations of the license plates. In a color texture based method, a license plate region is assumed to have discriminatory texture properties A support vector machine (SVM) classifier is used to determine whether a candidate region corresponds to a license plate or not. Only the template of a region is fed directly to the SVM to decrease the dimensionality of the representation. Next, license plate regions are identified by applying a continuously adaptive mean-shift process to the results of the color texture analysis.

Another method poses the detection task as a boosting problem. Over several iterations, an AdaBoost classifier selects a best performing weak classifier from a set of weak ones, each classifier acting on a single feature, and, once trained, combines their respective votes in a weighted manner. A strong classifier is then applied to sub-regions of an image being scanned for likely license plate locations. An optimization based on a cascade of classifiers, each specifically designed using false positive and false negative rates, helps to accelerate the scanning process.

In addition to single frame detection techniques, there exist methods that take advantage of video data by processing multiple consecutive frames.

One main drawback of all the above methods is that their performance depends on strong assumptions made about the appearance of objects. Most methods cannot handle in-plane and out-plane rotations, or are incapable of compensating for imaging noise and illumination changes. Simply enlarging the training dataset using rotated training samples often causes a deteriorated performance and increased false positive rate.

The region descriptors used for object detection should be invariant to rotations. The descriptors should also be able to distinguishing objects from the background under uncontrolled conditions.

Many different representations, including aggregated statistics, textons, and appearance models, have been used for object detection. Histograms are popular representations of nonparametric density. However, histograms disregard the spatial arrangement of the feature values. Moreover, histograms do not scale to higher dimensions. Appearance models are highly sensitive to the pose, scale and shape variations.

SUMMARY OF THE INVENTION

The embodiments of the invention provide a method for detecting objects in images. The method represents image features as covariance matrices. Instead of depending on a preset filter responses or appearance blind histograms as in the prior art, a covariance matrix is constructed of all available pixel-wise features within a given image region. This representation accurately captures the statistical and appearance properties of the region.

The method adapts an integral image based data propagation technique to extract the covariance matrices of candidate windows with a minimal computational load.

Intensity distribution within the candidate regions are normalized using a local polar histogram during the covariance matrix construction. The coefficients of the normalized covariance matrix are provided to a multilayer neural network as a feature descriptor. Thus, an evaluation of the candidate regions by the classifier is achieved without any distance measurements between the covariance matrices. This also allows the method to work without preset thresholds.

The covariance matrix representation is robust against in-plane rotations of the objects, and severe image noise. The polar histogram normalization further improves the accuracy of the detection under drastic illumination conditions.

The trained neural network framework provides adaptability to out-plane rotations. Because no explicit similarity or distance computation is required in this framework, the computational load of the detection method is very low. The method according to the embodiments of the invention outperforms conventional deterministic and statistical methods both in speed and in accuracy.

To improve an accuracy of object detection, the feature descriptor captures not only the appearance but also the statistical properties of image regions. Unlike the prior art texton representations, this descriptor has low dimensionality and is invariant to in-plane rotations.

In general, a single covariance matrix extracted from a region in an image is sufficient to match the region in different views and poses. The covariance matrix of any region has the same size. This enables comparison with any regions without being restricted to a constant window size.

DETAILED DESCRIPTION OF THE PREFERRED EMBODIMENT

Figure 1:
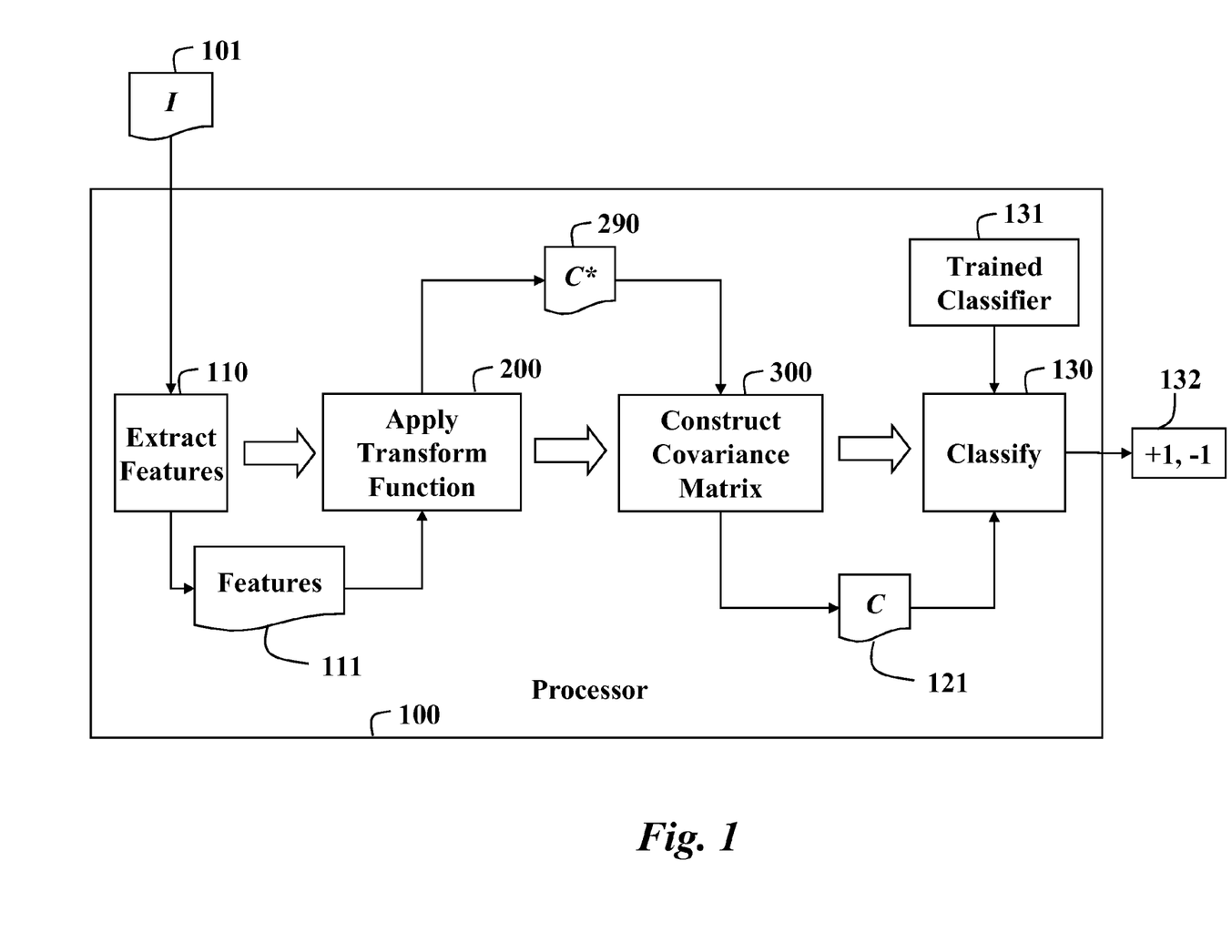
FIG. 1 is a flow diagram, of a method for detecting an object in an image according to an embodiment of the invention.
Figure 2:
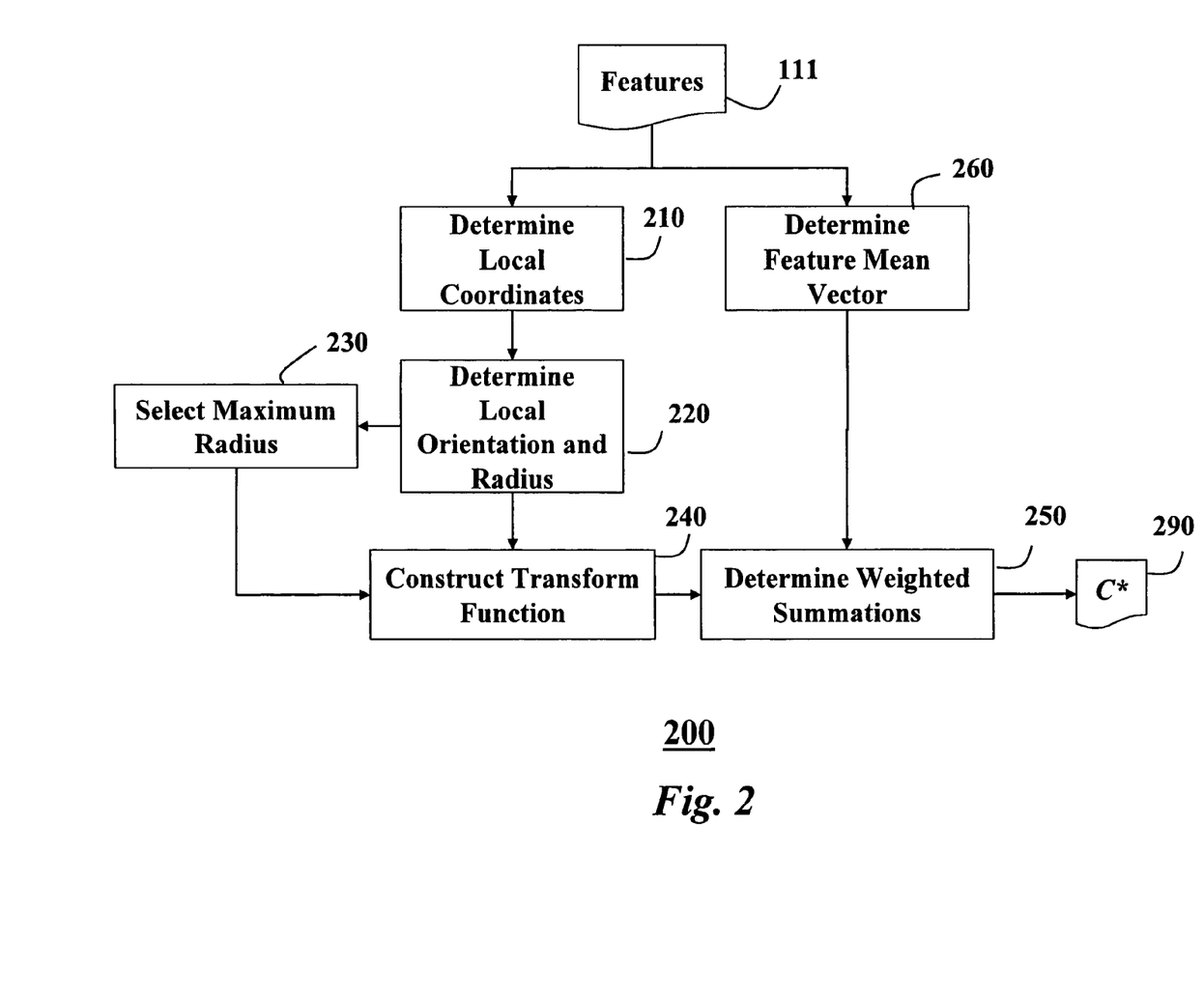
FIG. 2 is a flow diagram of a process for transforming features.

FIG. 1 shows a method and processor 100 for detecting objects in an image according to an embodiment of our invention. During a detecting phase, we extract 110 features 111 from different windows of an image I 101. We apply a frequency transform 200 to the features 111 to obtain transformed features C* 290.

From the transformed features, we construct 300 covariance matrices 121. The matrices can be invariant or sensitive to rotation.

Then, using a trained neural network 131, we classify 130 the image, using the covariance matrices 121, as including a particular object or not, e.g., [+1, −1] 132.

The object detection problem is a binary classification problem. We use the trained neural network 131 to determine whether a given window in the image corresponds to the object or not. Each window has an associated covariance matrix.

Training

The way that features are extracted and used to construct covariance matrices during a training phase is identical to the detecting phase described above.

During the one-time preprocessing training phase, we extract pixel-wise image features, including spatial gradients and moments. We model each positive (object) and negative (non-object) training image via covariance matrices, and provide this information to a neural network with +1, −1 labels, respectively.

Figure 4:
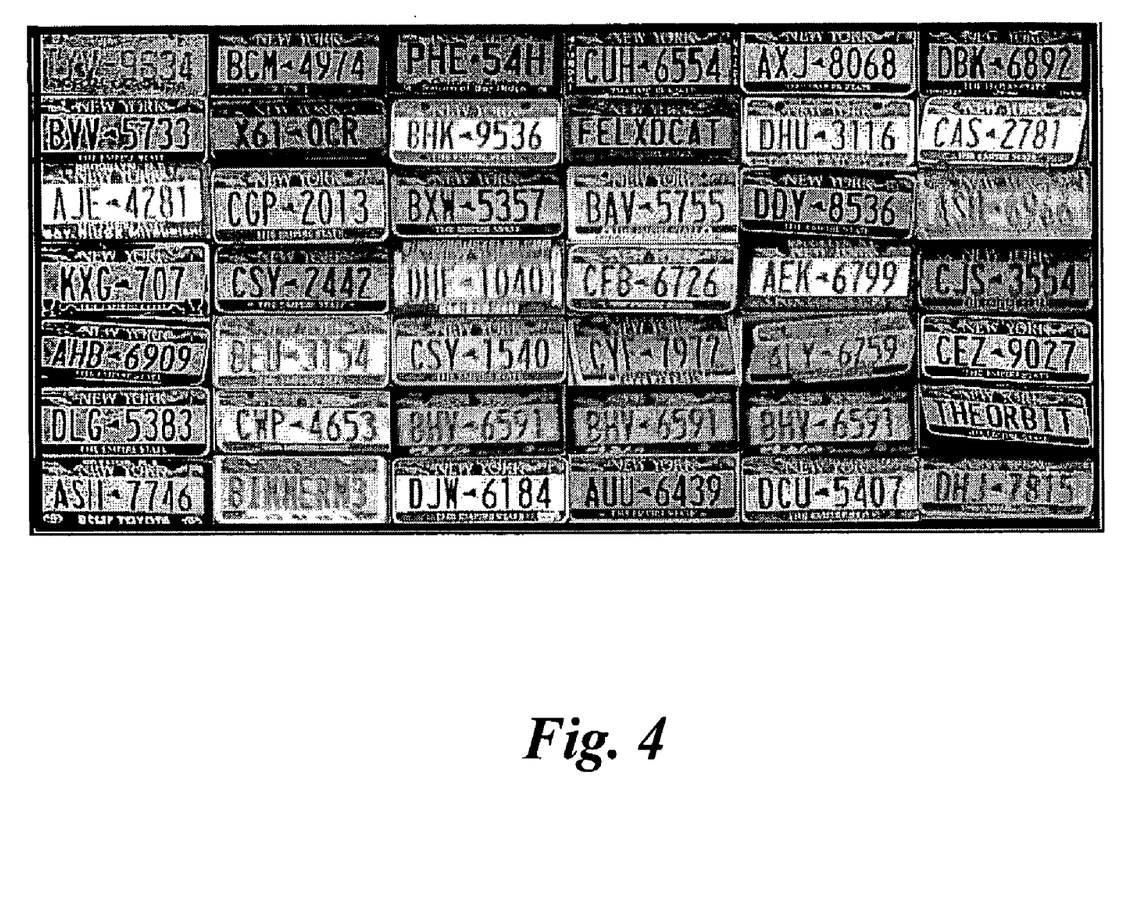
FIG. 4 are images of example objects.

Sample training images are shown in FIG. 4. We use a conventional feed-forward back-propagation type of neural network for the classifier 131, with three internal layers. During the detection phase, we scan a given image for candidate windows (regions), at different scales.

Conventionally, such an exhaustive search would be slow. Therefore, we use an integral image, see O. Tuzel, F. Porikli, and P. Meer, "Region covariance: A fast descriptor for detection and classification," Proc. 9th European Conf. on Computer Vision, Volume 2, pages 589-600, 2006, incorporated herein by reference.

We restructure the coefficients of the covariance matrix into a vector v(x), and send the vector to the trained neural network 131. A sign 132 of the (normalized) likelihood score produced by the classifier indicates an estimated class, e.g. positive for a particular object, otherwise negative.

Features

It should be noted again that the processes for extracting features and constructing covariance matrices are identical during the training and detecting phases.

We denote a two dimensional, $M_1 \times M_2$ size, image by 101 I. Each pixel in the image has an associated intensity. However, our method also generalizes to other type of images, e.g., color, multi-spectral, and thermal images. Let F be the $M_1 \times M_2 \times d$ dimensional feature matrix 111 extracted from the image I 101, as $$I(x,y) \xrightarrow{\Phi} F(x, y, d), \qquad (1)$$

where the function $\Phi$ can be any pixel-wise mapping, selected from the group of color, image gradients $I_x$, $I_{xx}$, ..., edge magnitude, edge orientation, filter responses, and other pixel-wise mappings. The group of features can be extended by including location, intensity, gradient, histograms, higher order derivatives, texture scores, radial distances, angles, and temporal frame differences in case a sequence of images (video).

For a given rectangular window $W \subset F$, let $f_k$, where $k=1, \ldots, N$ be the d-dimensional feature vectors for the window W. Here, N represents the number of pixels in the window. Each $f_k$ feature vector corresponds to a particular pixel (x, y) within that window. Note that, windows can be any arbitrary shape, e.g., rectangular, circular, irregular. The windows do not need to 'tile" the entire image. The windows can also overlap if desired.

We construct the feature vector $f_k$ using two types of attributes: spatial attributes that are obtained from pixel coordinate values (locations x, y); and appearance attributes, e.g., intensity and color. The features can be associated directly with the pixel coordinates as $$f_k = [xy I(x,y) I_x(x,y), \ldots]. \qquad (2)$$

As described below, the frequency transform is applied to the spatial attributes so that the corresponding appearance attributes are associated with the transformed locations.

Covariance Descriptor

A covariance is a measure of how much two variables vary together. We represent the window W with the $d \times d$ covariance matrix C 121 of the features $$C_W = \begin{bmatrix} \sigma_{11}^2 & \cdots & \sigma_{1d}^2 \\ \vdots & \ddots & \\ \sigma_{d1}^2 & & \sigma_{dd}^2 \end{bmatrix} \qquad (3)$$

$$\sigma_{ij}^2 = \frac{1}{N} \sum_{k=1}^{N} (f_k(i) - \mu(i))^T (f_k(j) - \mu(j)), \qquad (4)$$

where $\mu(i)$ is a mean of a corresponding feature i. The diagonal elements in the matrix represent the variance of a feature. For example, the $i^{th}$ diagonal element represents the variance for the $i^{th}$ feature. The off-diagonal elements represent the covariance between two different features i and j.

Figure 5:
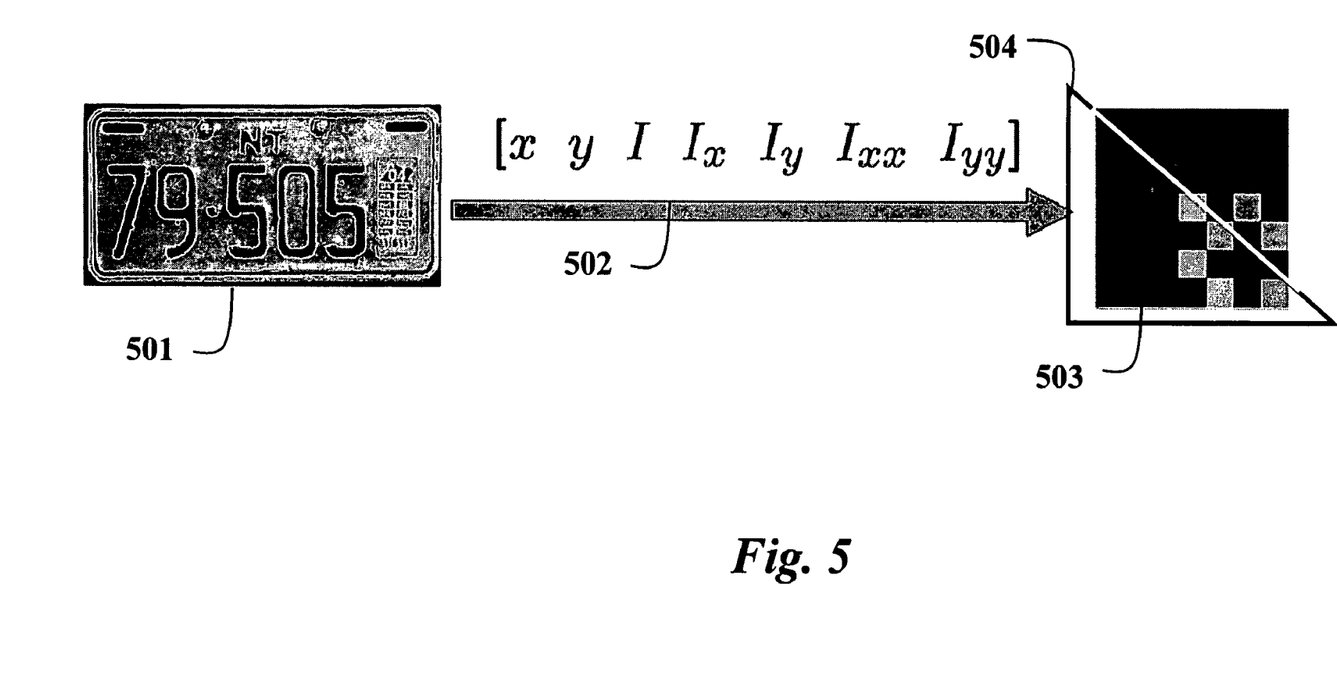
FIG. 5 is a schematic of transformed features according to an embodiment of the invention.

It should be noted that because the covariance matrix is symmetrical about the diagonal it is sufficient to only store a triangular portion which is half of the matrix, including the diagonal, see FIG. 5.

Transform Function

Because we want our representation to be rotation invariant, we use the feature frequency transform function 200 of the pixel coordinates instead of using the spatial features directly.

FIG. 2 shows the transform in greater detail. Local (x, y) coordinates are determined 210 for the features 111, followed by determining 220 local orientations and radius of the features. A maximum radius is selected 230, which can be used to construct 240 the transform function. The maximum is used for normalization to make the window scale invariant. For a rectangle, the maximum radius is the distance from the center to a farthest corner. We can also determine 260 feature mean vectors, which in turn are used to determine 250 weighed summations for the transformed features 290.

The transform function can be expressed as $$f_k = [g(x',y')I(x,y)I_x(x,y)\ldots], \quad (5)$$

where $$(x',y') = (x-x', y-y') \quad (6)$$

are relative coordinates, and (x', y') are coordinates of the center of the window.

We define a frequency transformed feature g as $$g(x', y') = e^{i\left(2\pi \frac{r(x',y')}{r_{max}} + \theta(x',y')\right)}, \text{ and} \quad (7)$$

where $$r(x',y') = (x'^2 + y'^2)^{1/2} \quad (8)$$

is a radial distance (radius) between the pixel and the center of the window, and $$\theta(x',y') = \arctan(y'/x') \quad (9)$$

is an orientation of the local location of the pixel with respect to the center of the window. The spatial coefficients of the covariance matrix are defined as $$\sigma^2_{g,g} = \sum_k^N (g_k(x', y'))^2 \quad (10)$$

$$\sigma^2_{g,j} = \sum_k^N g_k(x', y')(f_k(j) - \mu(j)) \quad g \neq j$$

The above numbers are complex numbers due to the frequency transform of Equation 7. The appearance features that do not involve spatial features are determined as described in Equation (4)

$$C^* = \begin{bmatrix} \sigma^2_{g,g} & \cdots & \sigma^2_{g,d} \\ \vdots & \ddots & \\ \sigma^2_{d,g} & & \sigma^2_{dd} \end{bmatrix}. \quad (11)$$

Figure 3:
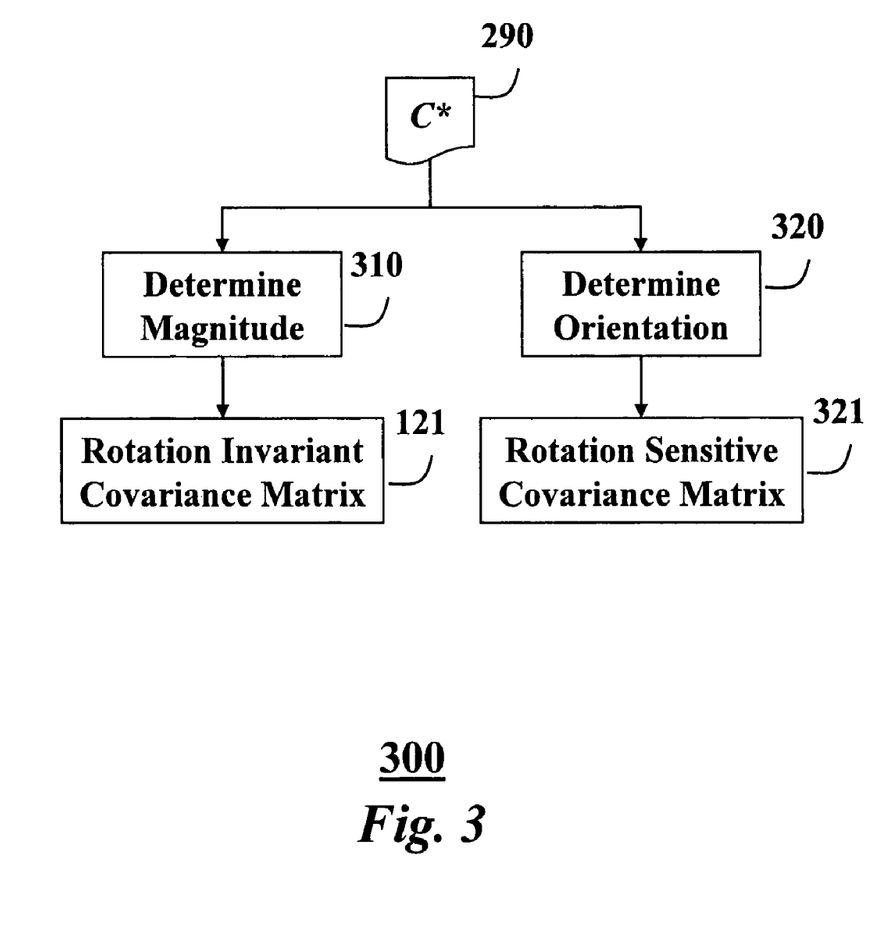
FIG. 3 is a flow diagram of a process for constructing covariance matrices.

As shown in FIG. 3, because the frequency transformed features 290 are complex numbers, we can determine 310 the magnitudes of the spatial features when we construct 300 the rotation invariant covariance matrices 121 as $$C = \begin{bmatrix} \|\sigma^2_{gg}\| & \cdots & \|\sigma^2_{gd}\| \\ \vdots & \ddots & \\ \|\sigma^2_{dg}\| & & \sigma^2_{dd} \end{bmatrix}. \quad (12)$$

To construct a rotation sensitive covariance descriptor, we determine 320 the orientation of the corresponding coefficients as $$C^\theta = \begin{bmatrix} <\sigma^2_{gg} & \cdots & <\sigma^2_{1g} \\ \vdots & \ddots & \\ <\sigma^2_{g1} & & \sigma^2_{dd} \end{bmatrix}, \quad (13)$$

and construct rotational variant features.

As shown in FIG. 3, we determine 320 orientations of the features to construct the rotation sensitive covariance matrices 321.

Figure 8:
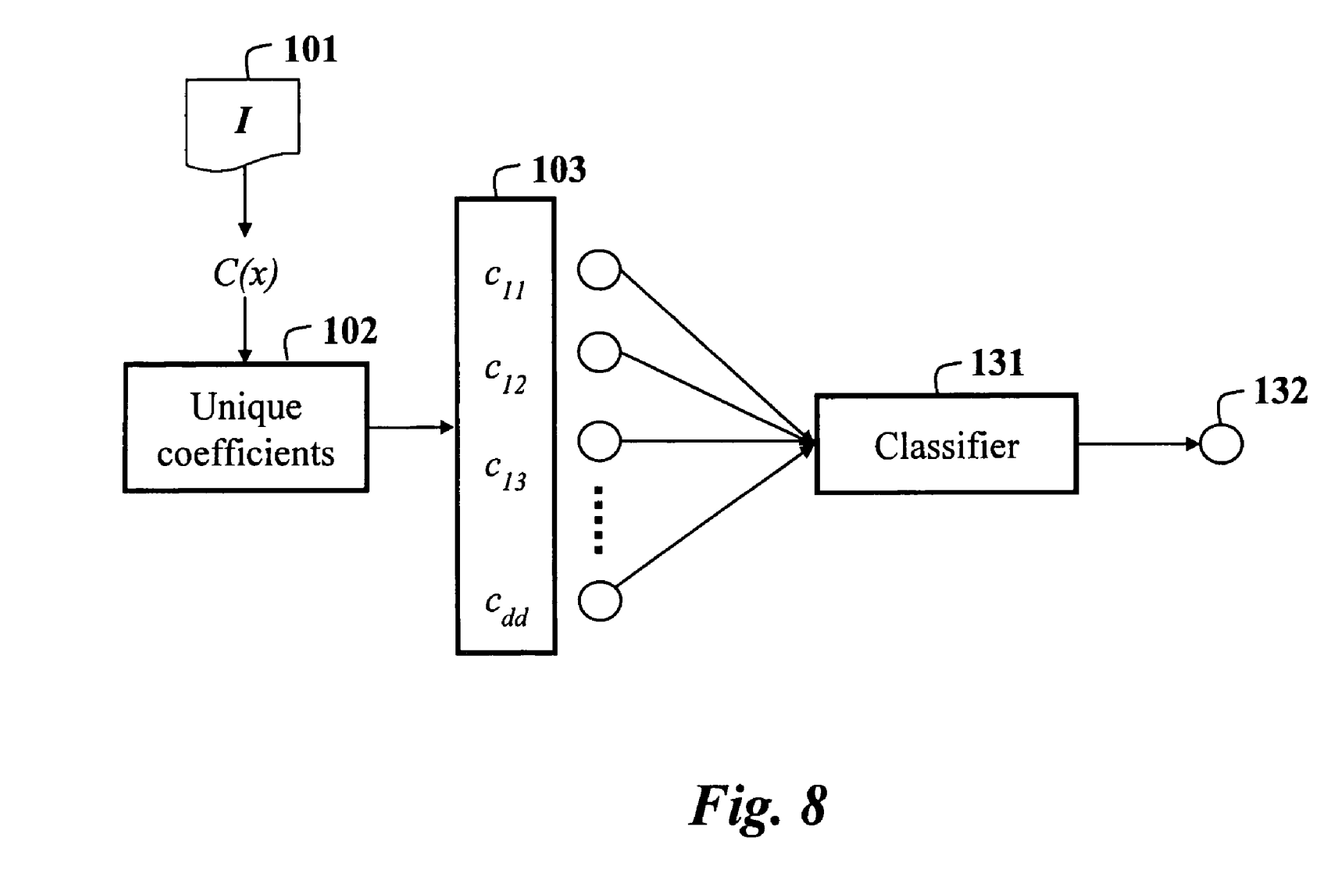
FIG. 8 is flow diagram of a detecting phase.

As shown in FIG. 8, after we obtain each rotation invariant covariance matrix 121, we construct a vector 103 using the unique coefficients 102 of the covariance matrix. The unique coefficients are $c_{ij}$ where i=1, ..., d and j=i, ..., d. In other words, we select the coefficients that are either in the upper or lower triangle of the square covariance matrix 503, see FIG. 5. Thus, we obtain the representative vector v(x) 103 for each given window x that is the feature descriptor. The feature descriptor is than classified 130 to determine whether the image contains the object or not.

FIG. 5 shows an image 501, features [x y I(x, y) $I_x$(x, y), ...] 502, and a sample 8×8 covariance matrix 503. Note that, even though using the radius r from the window center as the coordinate feature provides rotation invariance, the radius r also prevents spatial correlation. In other words, the radius r can not recognize pattern distortions as far as these distortions are located on the same radial circle.

Figure 6:
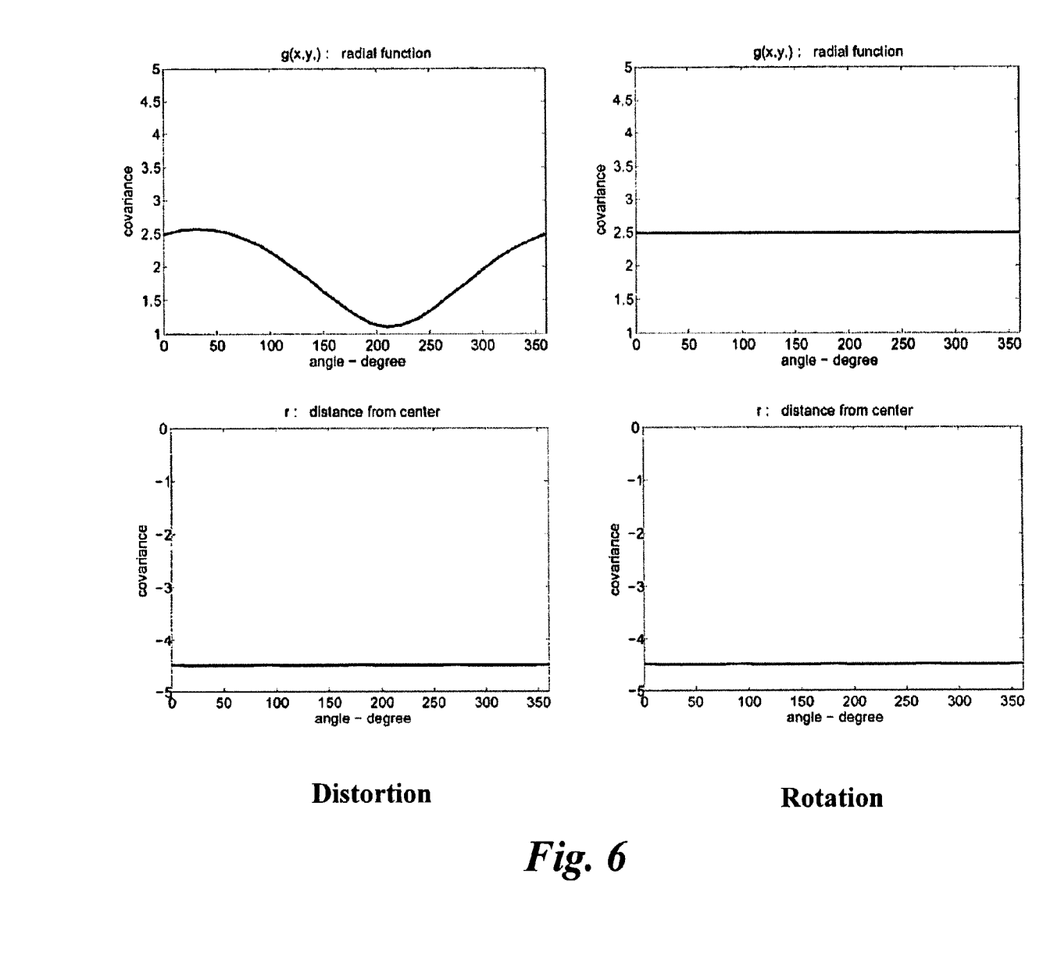
FIG. 6 are graphs of covariance distance that are computed according to embodiment of the invention.

As shown in the graphs of FIG. 6, we determine the covariance values for both rotated and distorted images for all angles. The top row of graphs in FIG. 6 corresponds to the covariance values between the frequency transform feature g and intensity I. The bottom row corresponds to covariance between the radially symmetric feature r and I. As shown, the radially symmetric feature r generates almost identical results for the rotated and distorted images. In other words, the feature r cannot differentiate the distortion from rotation even though the feature r is rotation invariant. In contrast, the covariance responses of the frequency transform feature g changes as the distortion becomes more drastic. In addition, the feature g is rotation invariant as desired.

Classifier

We use a neural network framework as the classifier 131. Our method extends to other classifiers that except vector data as input. We train the feed-forward back propagation neural network 131 with three internal layers. The number of inputs varies as a function of a size of the covariance matrices. Therefore, the number of unique coefficients in the matrices varies. Each neural network layer has a weight matrix, a bias vector, and an output vector.

Figure 7:
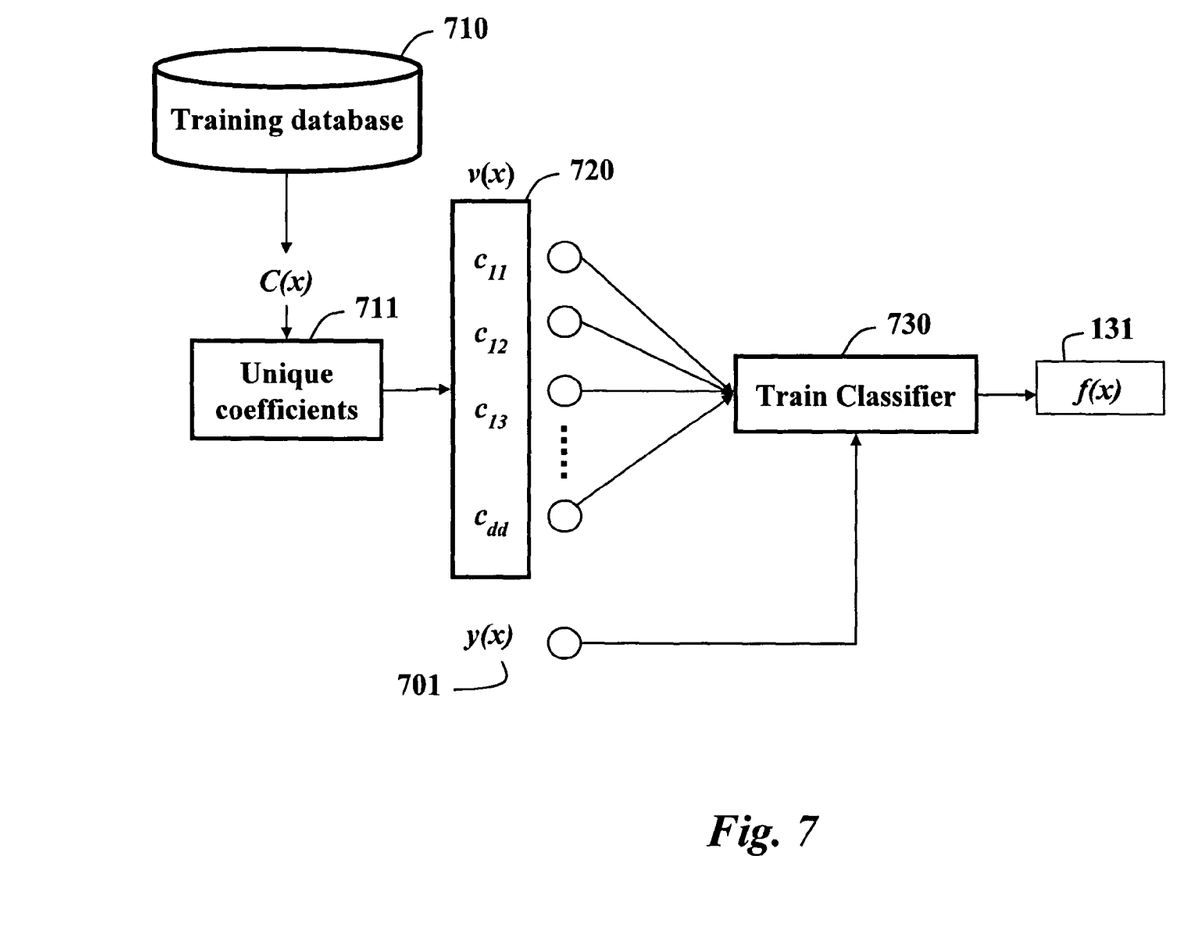
FIG. 7 is a flow diagram of a training phase.

As shown in FIG. 7, we use a database 710 includes set of positive (object) training images, and a set of negative (non-object) training images to train 730 the neural network 131. Typically, the set of negative images is much larger than the set of positive images, e.g., 300 object and 1000 non-object.

The same as described above, we construct a vector v(x) 720 using the unique coefficients 711 of each covariance matrix. The unique coefficients are $c_{ij}$ where i=1, . . . , d and j=i, . . . , d. In other words, we select the coefficients that are either in the upper or lower triangle 504 of the square covariance matrix 503. Thus, we obtain the representative vector v(x) 720 for each given window x that is the feature descriptor.

In the training phase, we have a label y(x) 701 of each window x in the training image, in addition to the vector v(x) 720. The label indicates whether the window x corresponds to a particular object (y(x)=1), or non-object (y(x)=−1). We train 730 the classifier 131 using the training vectors v(x) 720 and the labels y(x) 701.

As stated above, in one embodiment the classifier is a neural network classifier. In order to capture the non-linearity, the number of layers in the neural network should be greater than two. The output of the classifier f(x) 131 indicates a likelihood of the window including the object.

In the detection stage as shown in FIG. 8, we construct the vector v(x) 103, and apply the vector to the trained classifier 131. If the likelihood of f(x) is greater than zero, or some other predetermined threshold, than we classify the window as including the object, otherwise the window does not include an object.

The neural network uses a non-linear tan-sigmoid transfer function (tansig(z)), which calculates an output as $$tansig(z) = \frac{2}{1+e^{-2z}} - 1 \quad (9)$$

to make sure that the output likelihoods remain within a specified range, which is [−1, 1] 132.

EFFECT OF THE INVENTION

The method for detecting objects according to the embodiments of the invention has the following advantages. The covariance descriptor effectively captures both spatial and statistical properties of objects. The method is robust against noise. Because the mean is filtered, the method is substantially invariant to severe illumination changes. The frequency transform coordinate feature is invariant to rotations. The training of the network with the desired set of samples is a one time preprocessing step. After training, the detection of objects plates is very fast.

Because the covariance matrices do not lie in a Euclidean space, the distance cannot be computed by simple matrix subtraction. That requires finding the generalized eigenvalues of two matrices. The neural network based method successfully eliminates this costly operation by converting the problem into comparison of separate covariance values.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for detecting objects in an image, wherein the method, comprising the steps of:
    extracting features from an image;
    applying a frequency transform to the features to generate transformed features;
    constructing a covariance matrix from the transformed features;
    classifying the covariance matrix to determine whether the image includes the object, wherein the classifying is performed using a neural network trained with training images stored in a database in a one time preprocessing step; and
    outputting a likelihood that the image includes the object, wherein the extracting, applying, constructing, classifying and outputting steps are performed in a processor.

2. The method of claim 1, in which the features are extracted from multiple windows in the image, and the covariance matrix is constructed for each window to detect the object in the window.

3. The method of claim 1, in which the covariance matrix is invariant to a rotation of the object.

4. The method of claim 1, in which the covariance matrix is sensitive to a rotation of the object.

5. The method of claim 1, in which the trained neural network is a feed-forward back-propagation type of neural network with three internal layers.

6. The method of claim 1, further comprising:
    constructing an integral image from the image, and extracting the features from the integral image.

7. The method of claim 1, further comprising:
    restructuring the covariance matrix as a vector of unique coefficients, and classifying the vector.

8. The method of claim 1, in which the features include spatial features and appearance features, and the frequency transform is according to the spatial features.

9. The method of claim 1, in which the features are selected from the group consisting of locations, intensities, gradients, colors, image gradients, edge magnitude, edge orientations, filter responses, histograms, texture scores, radial distances, angles, and temporal differences.

10. The method of claim 1, wherein the object is detected in a sequence of images.

* * * * *